US011885181B2

(12) United States Patent
Parker et al.

(10) Patent No.: US 11,885,181 B2
(45) Date of Patent: Jan. 30, 2024

(54) BOX RAIL BACKUP AND METHOD

(71) Applicant: Werner Co., Greenville, PA (US)

(72) Inventors: Thomas W. Parker, Jamestown, PA (US); Kevin McIntire, Stoneboro, PA (US); Steve Dings, Mentor, OH (US); Robert D. Beggs, Stoneboro, PA (US); David Plotner, Sharpsville, PA (US)

(73) Assignee: Werner Co., Greenville, PA (US)

( * ) Notice: Subject to any disclaimer, the term of this patent is extended or adjusted under 35 U.S.C. 154(b) by 858 days.

(21) Appl. No.: 16/795,086

(22) Filed: Feb. 19, 2020

(65) Prior Publication Data

US 2021/0198943 A1 Jul. 1, 2021

Related U.S. Application Data

(60) Provisional application No. 62/954,276, filed on Dec. 27, 2019, provisional application No. 62/954,290, filed on Dec. 27, 2019.

(51) Int. Cl.

| | |
|---|---|
| ***E06C 7/08*** | (2006.01) |
| ***E06C 1/12*** | (2006.01) |
| ***E06C 7/50*** | (2006.01) |

(52) U.S. Cl.

CPC ................ *E06C 7/085* (2013.01); *E06C 1/12* (2013.01); *E06C 7/08* (2013.01); *E06C 7/086* (2013.01); *E06C 7/50* (2013.01)

(58) Field of Classification Search

CPC ..... E06C 1/12; E06C 7/08; E06C 7/50; E06C 7/086; E06C 7/085; Y10T 24/3918; Y10T 24/3492; Y10T 24/3493; Y10T 24/3488

(Continued)

(56) References Cited

U.S. PATENT DOCUMENTS

| | | | | |
|---|---|---|---|---|
| 1,025,493 A * | 5/1912 | Vogel | ..................... | A47B 13/08 108/161 |
| 1,191,729 A * | 7/1916 | Pool | .......................... | F16B 2/14 411/367 |

(Continued)

FOREIGN PATENT DOCUMENTS

| | | |
|---|---|---|
| GB | 1198512 | 7/1970 |

OTHER PUBLICATIONS

USPTO; U.S. Appl. No. 16/795,132; Final Rejection dated Oct. 5, 2023; (pp. 1-24).

(Continued)

*Primary Examiner* — Daniel P Cahn
*Assistant Examiner* — Shiref M Mekhaeil
(74) *Attorney, Agent, or Firm* — Fitch, Even, Tabin, & Flannery LLP

(57) ABSTRACT

A ladder having a first box rail having a first side, and a second side extending perpendicularly from the first side. The first side having a first hole. The second side having a first hole in alignment with the first hole of the first side. The ladder having a second box rail, at least a portion of which is in parallel and spaced relation with the first box rail. The ladder comprises a first hollow tube disposed in the first box rail in alignment with the first hole of the first side and the first hole of the third side. The ladder comprises a bracket having a first bracket hole in alignment with the first hole of the first side. The ladder comprises a first fastener extending through the first hole of the third side, the first hollow tube, the first hole of the first side and the first hole of the bracket which attaches the bracket to the first box rail. A method for using a ladder. A method for producing a ladder.

10 Claims, 17 Drawing Sheets

(58) Field of Classification Search
USPC .................................. 182/209; 411/501, 546
See application file for complete search history.

(56) References Cited

U.S. PATENT DOCUMENTS 1,835,243 A * 12/1931 Schaffert .................. F16B 5/02 411/546
2,327,585 A * 8/1943 Ulrich .................. B62D 27/065 296/30
2,509,192 A * 5/1950 Poupitch .................. F16B 15/06 411/508
2,545,752 A * 3/1951 Singleton .................. F22B 7/16 411/43
2,560,961 A * 7/1951 Knohl .................. F16B 37/122 411/173
2,562,336 A * 7/1951 Selden .................. F16B 5/04 29/523
2,713,284 A * 7/1955 Bedford, Jr. .......... F16B 21/086 411/508
2,760,706 A 8/1956 Pearl
2,767,877 A * 10/1956 Newsom .................. F16B 5/04 411/501
2,957,543 A 10/1960 Elmore
2,989,141 A 6/1961 Howard
3,002,582 A 10/1961 Marcelis
3,004,625 A 10/1961 Arnold
3,030,850 A * 4/1962 Minor .................. B21J 15/04 403/368
3,076,668 A * 2/1963 Famely .................. F16L 5/027 285/137.11
3,078,002 A * 2/1963 Rodgers, Jr. .............. F16B 5/01 428/116
3,092,162 A * 6/1963 Johnsen ................ F16B 37/122 411/968
3,099,057 A * 7/1963 Cook .................. F16B 19/10 411/501
3,103,547 A * 9/1963 Ansley ................ H01R 12/526 174/262
3,168,938 A 2/1965 Shaver
3,181,651 A 5/1965 Larson
3,208,554 A 9/1965 Arnold
3,232,378 A 2/1966 Larson
3,270,410 A * 9/1966 Salter .................. B23P 9/025 29/446
3,279,835 A 10/1966 Krohm
3,283,402 A 11/1966 Larson
3,318,413 A 5/1967 Werner
3,327,385 A 6/1967 Shaver
3,343,630 A 9/1967 Redman
3,349,870 A 10/1967 Lieblein
3,354,987 A 11/1967 Werner
3,402,788 A 9/1968 Redman
3,426,867 A 2/1969 Berger
3,452,149 A * 6/1969 Rinaldi .................. H01R 12/58 403/197
3,454,135 A 7/1969 Redman
3,462,114 A * 8/1969 Walden, Jr. ........... F16B 43/005 411/338
3,481,026 A 12/1969 Lindesmith
3,484,931 A 12/1969 Lindesmith
3,491,853 A 1/1970 Stillman, Jr.
3,528,525 A 9/1970 Lindesmith
3,545,072 A 12/1970 Lindesmith
3,766,631 A 10/1973 Scheitlin
3,830,134 A * 8/1974 Erickson ............... F16B 37/043 411/970
3,836,704 A * 9/1974 Coules .................. H05K 7/142 411/908
3,837,208 A * 9/1974 Davis .................. B21J 15/043 411/501
3,844,588 A 10/1974 Jocsak
3,880,257 A 4/1975 Gubri
3,893,776 A 7/1975 Beattie
3,935,926 A 2/1976 Butler
4,010,519 A * 3/1977 Worthing ................ F16B 19/10 24/67 CF
4,033,243 A * 7/1977 Kirrish .................. F16B 37/145 411/338
4,140,040 A * 2/1979 Modrey ................ F16B 37/122 220/327
4,177,879 A 12/1979 Frank
4,205,426 A 6/1980 Stillman, Jr.
4,219,102 A 8/1980 Archer
4,244,661 A * 1/1981 Dervy ...................... F16B 5/01 403/243
4,261,436 A 4/1981 Stillman, Jr.
4,363,580 A * 12/1982 Bell ...................... F16B 19/10 411/501
4,449,878 A * 5/1984 Hallock .................. F16B 19/06 411/495
4,557,100 A * 12/1985 Gorges ...................... B64C 1/18 411/501
4,597,687 A 7/1986 Colas
4,656,721 A 4/1987 Werner
4,698,896 A 10/1987 Osterwald
4,761,105 A * 8/1988 Gardner .............. F16B 19/1081 411/501
4,766,664 A 8/1988 Benedyk
4,773,804 A * 9/1988 Ausprung .............. F16B 21/12 411/501
4,784,550 A * 11/1988 Wollar .................. H05K 7/142 411/908
4,802,643 A * 2/1989 Uys ...................... H02G 3/0456 403/363
4,807,351 A 2/1989 Berg
4,934,861 A * 6/1990 Weeks ...................... F16B 7/18 411/533
4,967,879 A 11/1990 Klafs
5,040,917 A * 8/1991 Camuffo ................ B62D 21/09 411/338
5,244,326 A * 9/1993 Henriksen ............ F16B 33/002 411/339
5,304,012 A 4/1994 Wendling
5,317,798 A 6/1994 Thompson
5,528,812 A * 6/1996 Muller .................. F16B 37/062 29/520
5,682,678 A * 11/1997 Gallagher ................. F16B 5/01 29/523
5,685,663 A * 11/1997 Sadri ..................... E04B 1/2403 403/284
5,758,745 A 6/1998 Beggs
6,012,763 A * 1/2000 Clemente ................ B60J 5/108 411/338
6,113,327 A 9/2000 Schrader
6,269,909 B1 8/2001 Grimes
6,290,213 B1 * 9/2001 Laird .................... E04F 11/181 256/65.05
6,419,046 B1 7/2002 Cubbison
6,511,274 B1 * 1/2003 Nagayama ............ F16B 37/065 411/181
7,086,499 B2 8/2006 Moss
7,201,398 B1 * 4/2007 Christofaro ............ B62D 21/12 180/312
7,300,536 B1 * 11/2007 Wang .................... F16B 11/008 296/205
8,371,783 B2 * 2/2013 Diehl .................... F16B 37/068 411/103
8,434,984 B2 * 5/2013 Toosky ................... F16B 19/05 411/362
8,484,930 B2 * 7/2013 Ruehl .................... B62D 21/09 52/843
8,591,158 B2 * 11/2013 Diehl .................... F16B 37/068 411/103
8,668,049 B2 * 3/2014 Leng ....................... E06C 7/086 182/228.3
8,807,281 B1 8/2014 Hoffman
10,661,837 B2 * 5/2020 Madsen ............... B62D 27/065
10,753,224 B2 * 8/2020 Mena Dominguez .... F02C 7/20
10,760,335 B2 9/2020 Mora
11,142,949 B2 10/2021 Leng
11,274,494 B2 3/2022 Leng

(56) References Cited

U.S. PATENT DOCUMENTS

| | | | | |
|---|---|---|---|---|
| 2003/0143053 | A1 * | 7/2003 | Kanie | F16B 5/0642 411/45 |
| 2004/0175254 | A1 * | 9/2004 | Peng | F16B 25/00 411/501 |
| 2006/0137166 | A1 * | 6/2006 | Babej | F16B 37/065 411/181 |
| 2006/0228194 | A1 * | 10/2006 | Nilsen | F16B 4/004 411/546 |
| 2007/0107368 | A1 * | 5/2007 | Ruehl | E04C 3/07 52/843 |
| 2010/0124471 | A1 * | 5/2010 | Diehl | F16B 5/02 411/103 |
| 2011/0150597 | A1 * | 6/2011 | Muramatsu | F16B 19/1081 411/22 |
| 2015/0075908 | A1 | 3/2015 | Moss | |
| 2018/0163468 | A1 | 6/2018 | Mora | |
| 2021/0079727 | A1 | 3/2021 | Gutierrez | |

OTHER PUBLICATIONS

USPTO; U.S. Appl. No. 16/795,171; Notice of Allowance and Fees Due (PTOL-85) dated Aug. 28, 2023; (pp. 1-12).

* cited by examiner

BOX RAIL BACKUP AND METHOD

CROSS-REFERENCE TO RELATED APPLICATIONS

This application claims priority from U.S. provisional application Ser. No. 62/954,276 filed Dec. 27, 2019, and U.S. provisional application Ser. No. 62/954,290 filed Dec. 27, 2019, both of which are incorporated by reference herein. This application also incorporates by reference U.S. patent application Ser. No. 16/795,132, filed concurrently with this application on Feb. 19, 2020; and incorporates by reference U.S. patent application Ser. No. 16/795,171, filed concurrently with this application on Feb. 19, 2020.

FIELD OF THE INVENTION

The present invention is related to components and a method of supporting or backing up the webs of hollow structural elements such as ladder box rails so that rivets or other fasteners which pass through the webs can be firmly clinched or tightened to hold components securely to the rails without causing the webs of the rail to flex inward. (As used herein, references to the "present invention" or "invention" relate to exemplary embodiments and not necessarily to every embodiment encompassed by the appended claims.)

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Box rails have great torsional rigidity compared to C or I cross section rails. This results in a ladder with box rails having greater torsional stiffness for the same weight. The difficulty lies in trying to secure components to the box rails such as guide brackets, locks, foot assemblies, etc., using inexpensive rivets. U.S. Pat. No. 7,086,499 describes collars positioned between the webs of a hollow rail which surround rungs specifically. This invention permits rivets to be solidly supported when clinched even though they pass through a hollow box rail.

BRIEF SUMMARY OF THE INVENTION

The present invention pertains to a ladder. The ladder comprises a first box rail having a first side, a second side extending perpendicularly from the first side, a third side extending perpendicularly from the second side and in parallel and spaced relation with the first side, and a fourth side extending perpendicularly from the third side and in parallel and spaced relation with the second side. The first side having a first hole and preferably a second hole. The third side having a first hole in alignment with the first hole of the first side and preferably a second hole in alignment with the second hole of the first side. The ladder comprises a second box rail, at least a portion of which is in parallel and spaced relation with the first box rail. The ladder comprises a first rung attached to and extending between the first and second box rails. The ladder comprises a second rung attached to and extending between the first and second box rails. The ladder comprises a first hollow tube disposed in the first box rail in alignment with the first hole of the first side and the first hole of the second side. The ladder preferably comprises a second hollow tube disposed in the first box rail in alignment with the second hole of the first side and the second hole of the third side. The ladder comprises a bracket having a first bracket hole in alignment with the first hole of the first side and preferably a second bracket hole in alignment with the second hole of the first side. The ladder comprises a first fastener extending through the first hole of the third side, the first hollow tube, the first hole of the first side and the first hole of the bracket which attaches the bracket to the first box rail. The ladder preferably comprises a second fastener extending through the second hole of the third side, the second hollow tube, the second hole of the first side and the second bracket hole of the bracket which attaches the bracket to the first box rail.

The present invention pertains to a method for using a ladder. The method comprises the steps of moving the ladder to a desired location. There is the step of securing the ladder at the desired location so a user may safely climb the ladder. The ladder is described above.

The present invention pertains to a method for producing a ladder. The method comprises the steps of attaching a bracket to a first box rail of the ladder by inserting a first fastener through a first hole of a third side of the first box rail of the ladder, a first hollow tube, a first hole of a first side of the first box rail and a first hole of a bracket. The ladder having a second box rail, at least a portion of which is in parallel and spaced relation with the first box rail, a first rung attached to and extending between the first and second box rails, and a second rung attached to and extending between the first and second box rails. There is preferably the step of inserting a second fastener extending through a second hole of the third side, a second hollow tube, a second hole of the first side and a second bracket hole of the bracket so the first hollow tube is disposed in the first box rail in alignment with the first hole of the first side and the first hole of the second side. The second hollow tube is disposed in the first box rail in alignment with the second hole of the first side and the second hole of the second side, and the first bracket hole of the bracket is in alignment with the first hole of the first side and the second bracket hole is in alignment with the second hole of the first side.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1D:
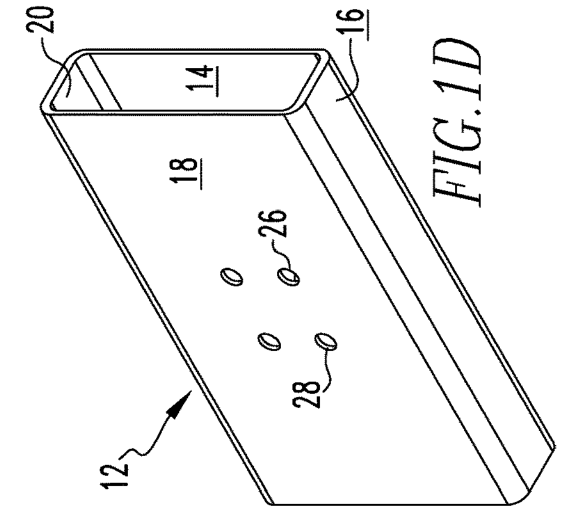
FIGS. 1A-1E show a short section of a hollow structural member.
Figure 1B:
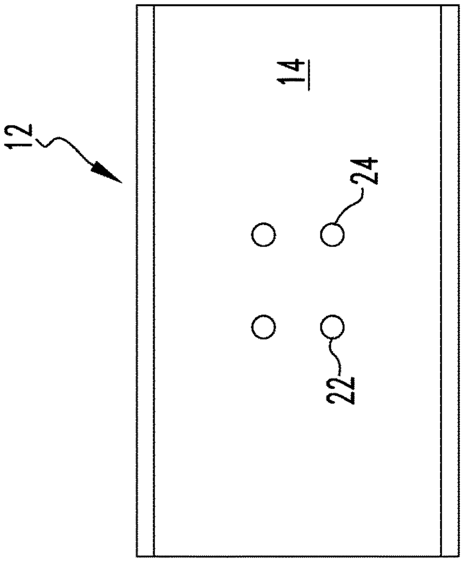
Figure 1C:
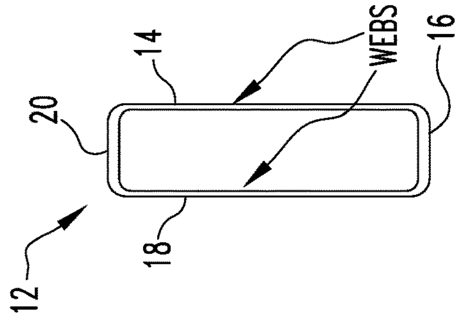
Figure 1A:
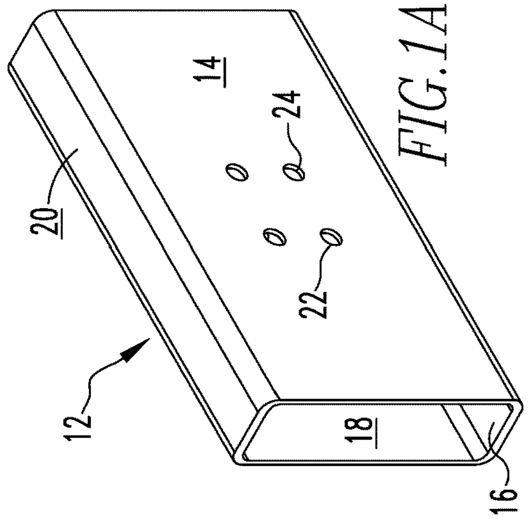
Figure 1E:
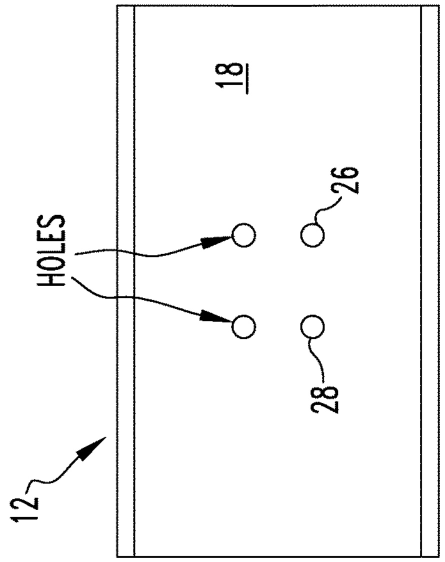

Referring now to the drawings wherein like reference numerals refer to similar or identical parts throughout the several views, and more specifically to FIGS. 5A-5D, 6A-6C, 12A and 14 thereof, there is shown, a ladder 10. The ladder 10 comprises a first box rail 12 having a first side 14, a second side 16 extending perpendicularly from the first side 14, a third side 18 extending perpendicularly from the second side 16 and in parallel and spaced relation with the first side 14, and a fourth side 20 extending perpendicularly from the third side 18 and in parallel and spaced relation with the second side 16. The first side 14 having a first hole 22 and preferably a second hole 24. The third side 18 having a first hole 26 in alignment with the first hole 22 of the first side 14 and preferably a second hole 26 in alignment with the second hole 24 of the first side 14. The ladder 10 comprises a second box rail 30, at least a portion of which is in parallel and spaced relation with the first box rail 12. The ladder 10 comprises a first rung 32 attached to and extending between the first and second box rails 12, 30. The ladder 10 comprises a second rung 34 attached to and extending between the first and second box rails 12, 30. The ladder 10 comprises a first hollow tube 36 disposed in the first box rail 12 in alignment with the first hole 22 of the first side 14 and the first hole 26 of the third side 18. The ladder 10 preferably comprises a second hollow tube 38 disposed in the first box rail 12 in alignment with the second hole 24 of the first side 14 and the second hole 28 of the third side 18. The ladder 10 comprises a bracket 40 having a first bracket hole 42 in alignment with the first hole 22 of the first side 14 and preferably a second bracket hole 44 in alignment with the second hole 24 of the first side 14. The ladder 10 comprises a first fastener 46 extending through the first hole 26 of the third side 18, the first hollow tube 36, the first hole 22 of the first side 14 and the first hole 42 of the bracket which attaches the bracket 40 to the first box rail 12. The ladder 10 preferably comprises a second fastener 48 extending through the second hole 28 of the third side 18, the second hollow tube 38, the second hole 24 of the first side 14 and the second bracket hole 44 of the bracket 40 which attaches the bracket 40 to the first box rail 12. The number of holes and tubes in the first and third sides may simply be one or two or three or four or even more, depending on what is desired and needed to insure a stable and sturdy attachment with one or two or three or four or even more fasteners positioned in the respective holes and respective tubes to hold a desired object.

The first and second holes 22, 24 of the first side 14 may have a larger diameter than the first and second holes 26, 28 of the third side 18, as shown in FIGS. 4A-4E. The diameter of the first and second tubes 36, 38 may be larger than the diameter of the first and second holes 26, 28 of the third side 18. An outside end 50 of the first tube 36 may be disposed in the first hole 22 of the first side 14 and an outside end 52 of the second tube 38 may be disposed in the second hole 24 of the first side 14, as shown in FIGS. 5A-5D.

The ladder 10 may include a plate 54 having a first plate hole 56 and a second plate hole 58, as shown in FIGS. 7A-7M. The first and second tubes may be attached to the plate 54. The first tube 36 may be aligned with the first plate hole 56, and the second tube 38 may be aligned with the second plate hole 58.

Figure 8B:
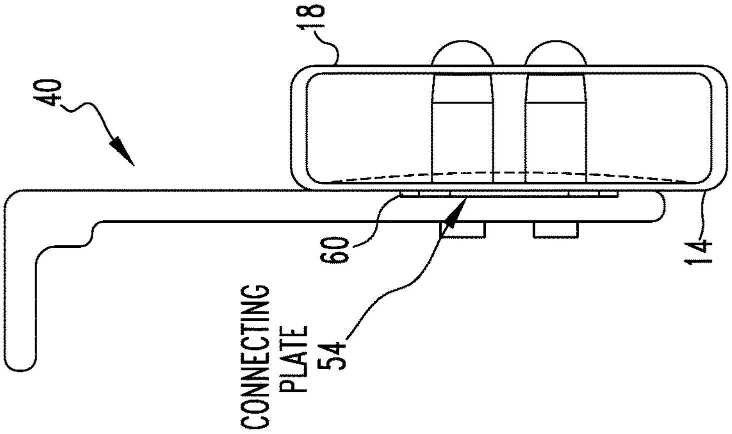
FIGS. 8A-8C show that the bracket is firmly clinched against the thin plate of the backup support tubes.
Figure 8A:
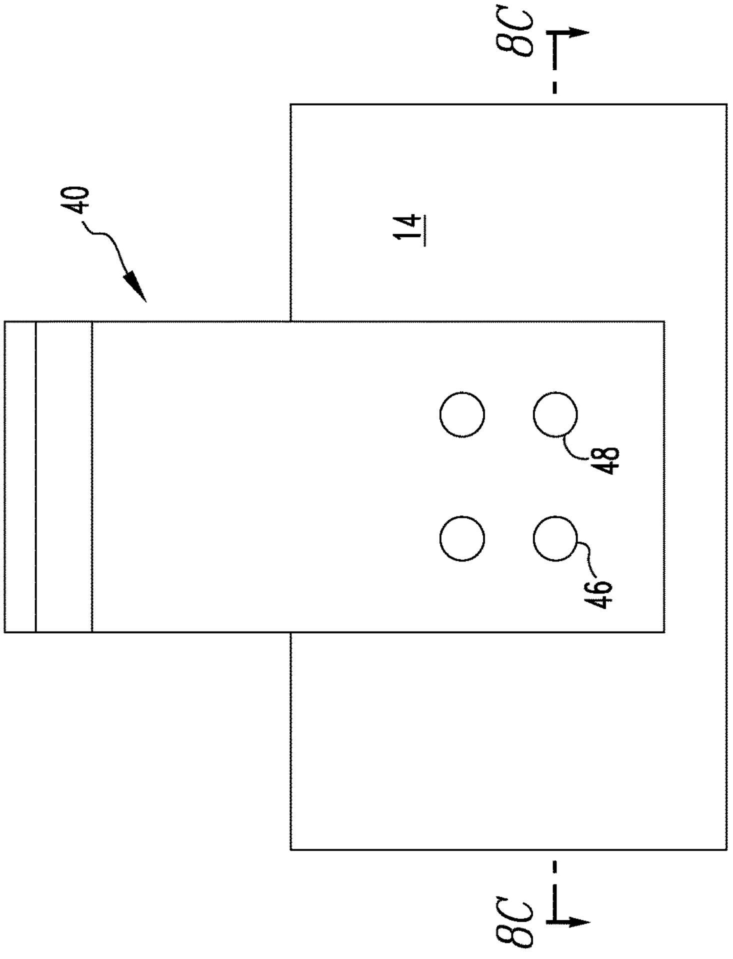
Figure 8C:
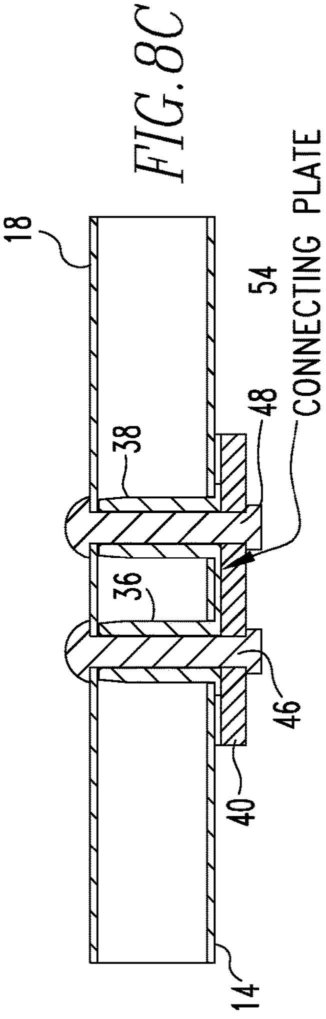
Figure 9A:
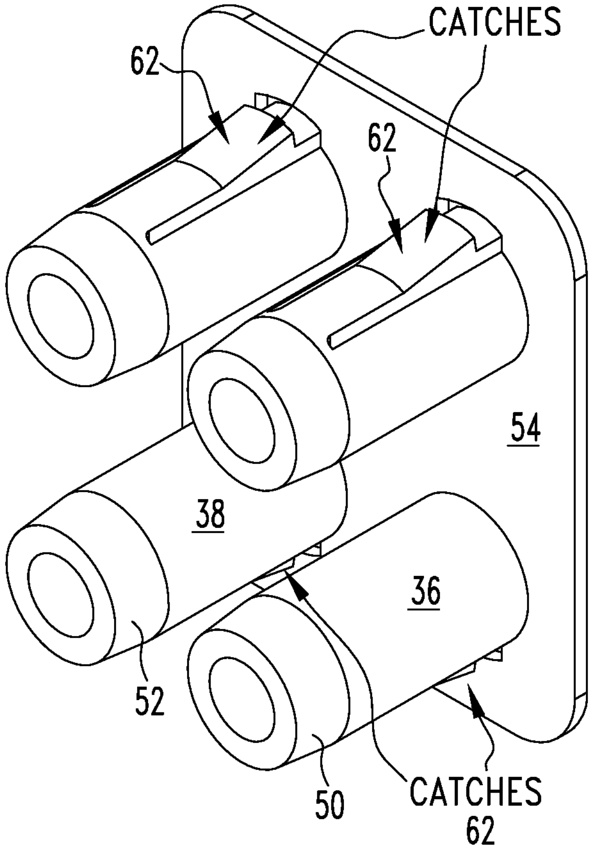
FIGS. 9A-9E show a further development of the embodiment of FIGS. 7A-7G. Catches are formed on one side of each of the four backup support tubes within the bundle.
Figure 9B:
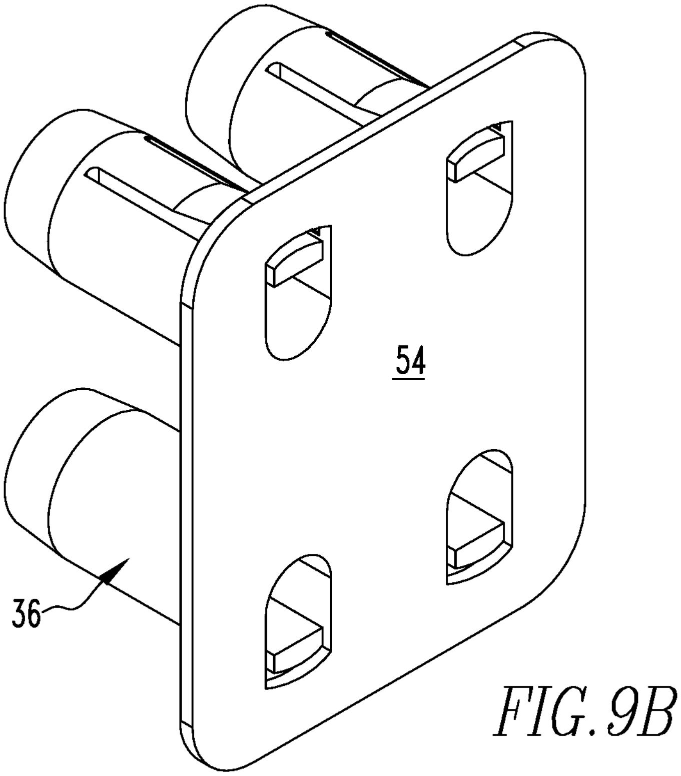
Figure 9E:
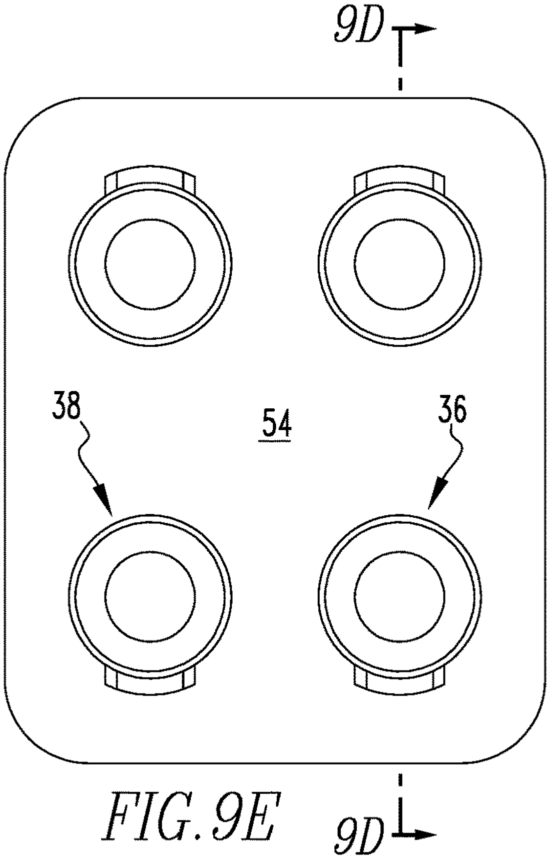
Figure 9C:
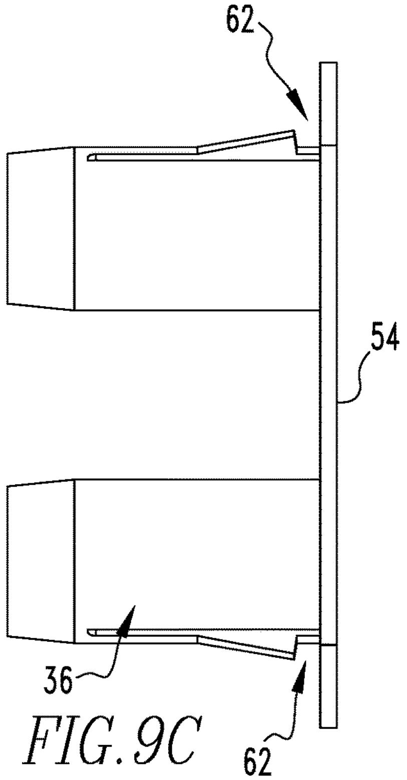
Figure 9D:
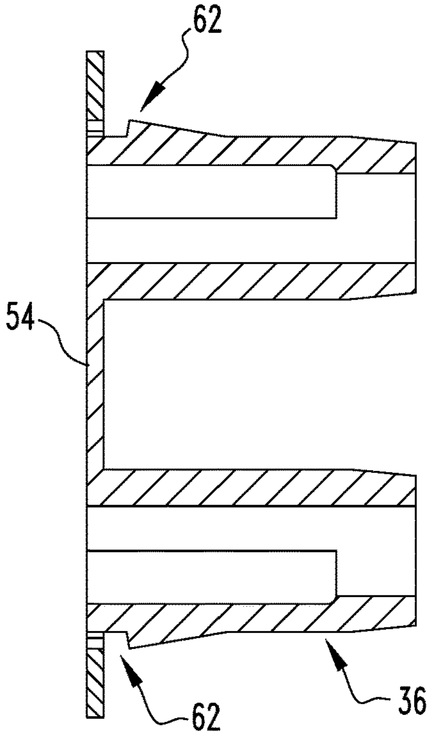

The plate 54 may be disposed between the first side 14 and the bracket 40, as shown in FIGS. 8A-8C. The first fastener 46 may extend through the first hole 26 of the third side 18, the first tube 36, the first hole 22 of the first side 14, the first plate hole 56 and the first hole 42 of the bracket to fasten the bracket 40 to the first box rail 12. The second fastener 48 may extend through the second hole 28 of the third side 18, the second tube 38, the second hole 24 of the first side 14, the second plate hole 58 in the second hole 44 of the bracket to fasten the bracket 40 to the first box rail 12. The plate 54 and the first tube 36 and the second tube 38 may be one continuous piece. The bracket 40 may have a relief 60 in which the plate 54 fits. The first tube 36 and the second tube 38 each may have a catch 62 disposed adjacent the outside end 50 of the first tube 36 and the second tube 38 which retains the first and second tubes to the first side 14, as shown in FIGS. 9A-9K. FIGS. 9A-9E show a plate 54 having a total of four tubes extending from the plate 54. FIGS. 9-9K show a plate 54 having a total of 2 tubes extending from the plate 54.

Figure 12A:
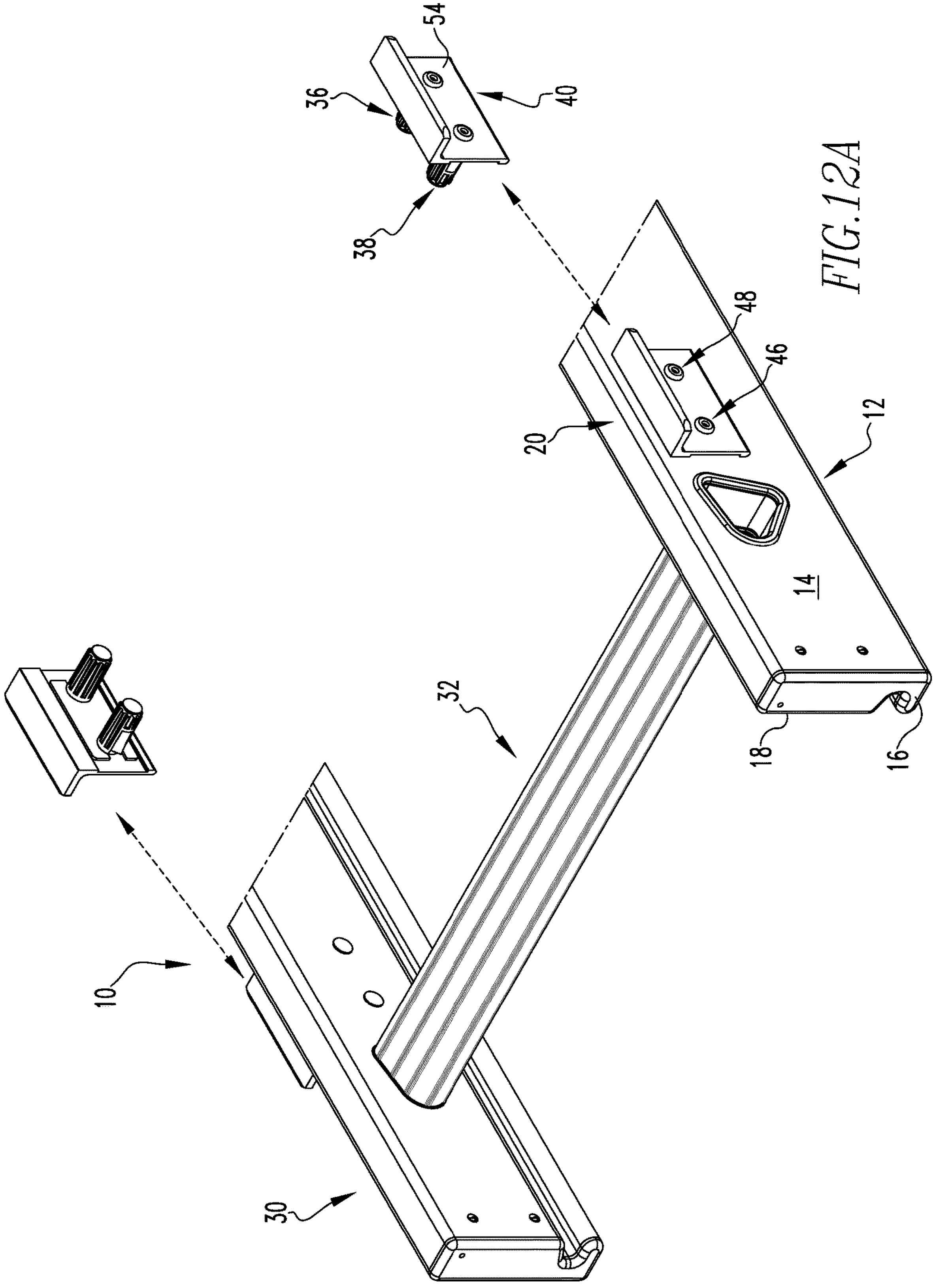
FIGS. 12A-12C show a ladder with a guide bracket.
Figure 12C:
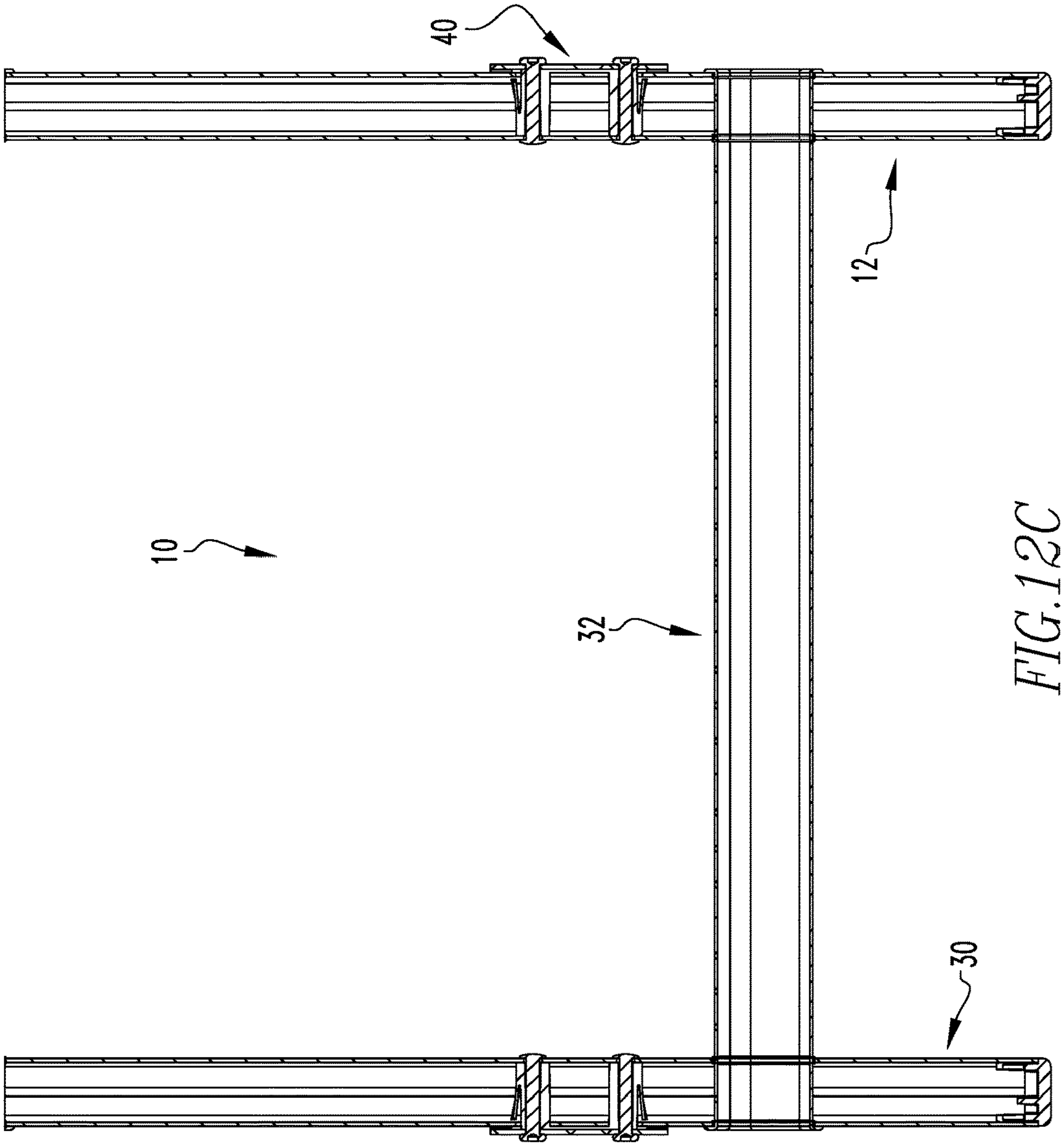
Figure 12B:
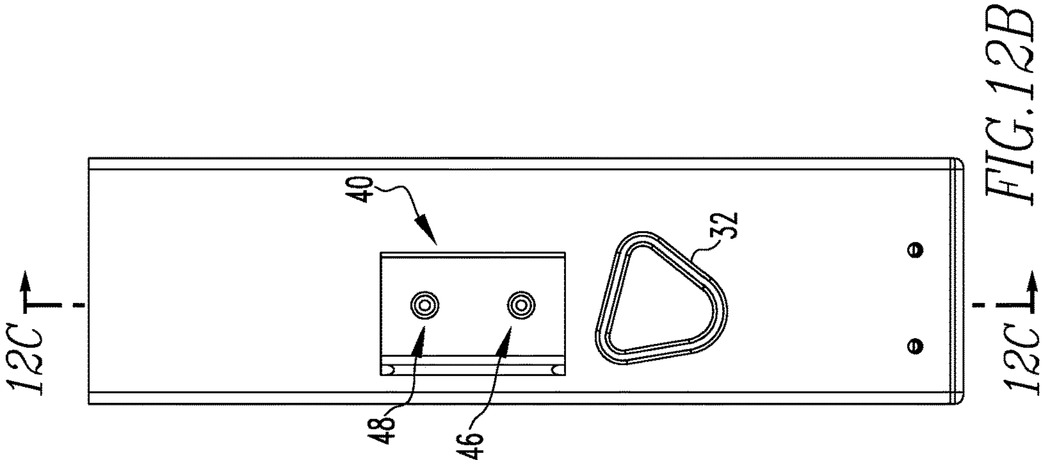
Figure 13:
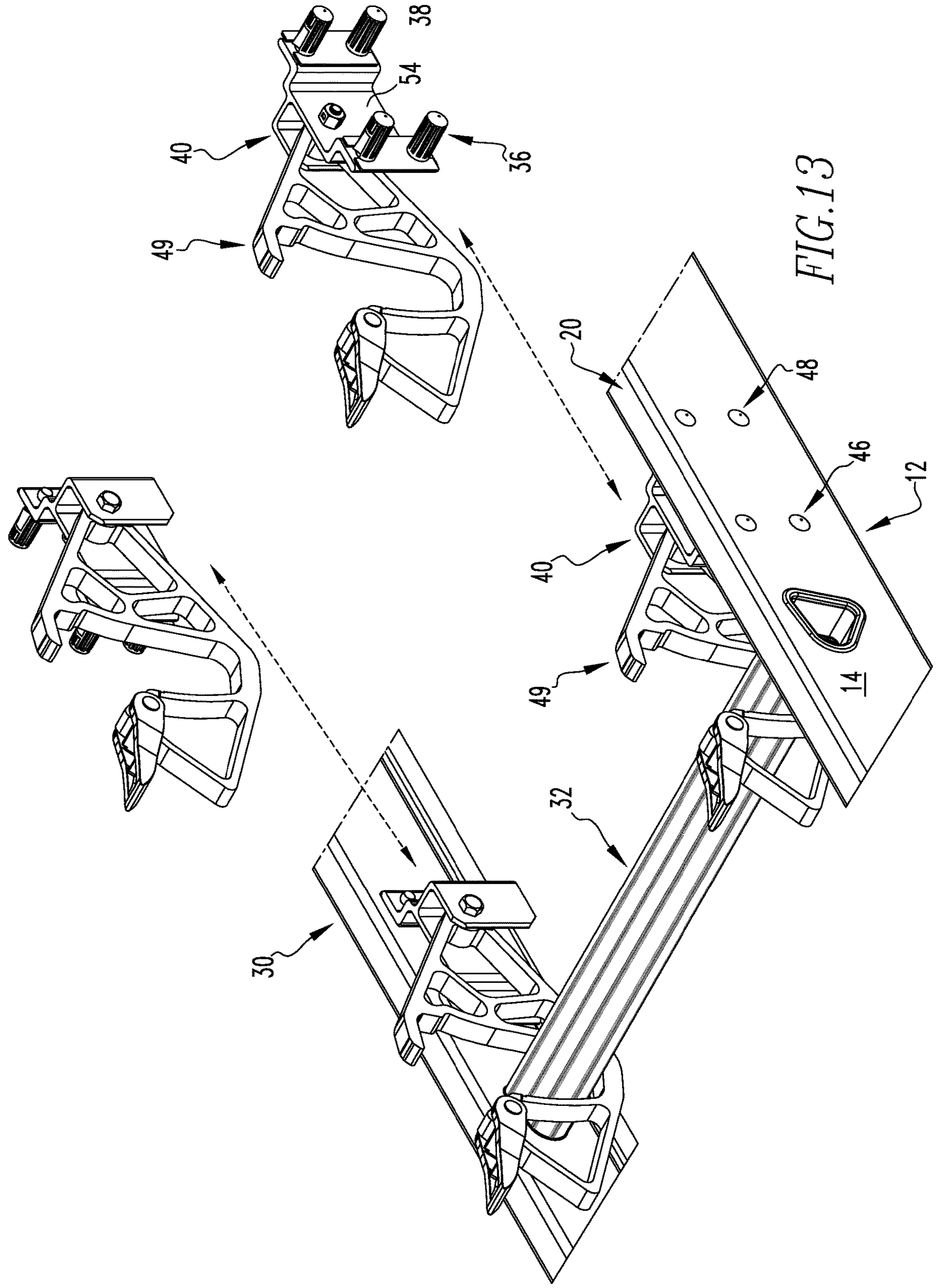
FIG. 13 shows a ladder with a lock bracket.
Figure 14:
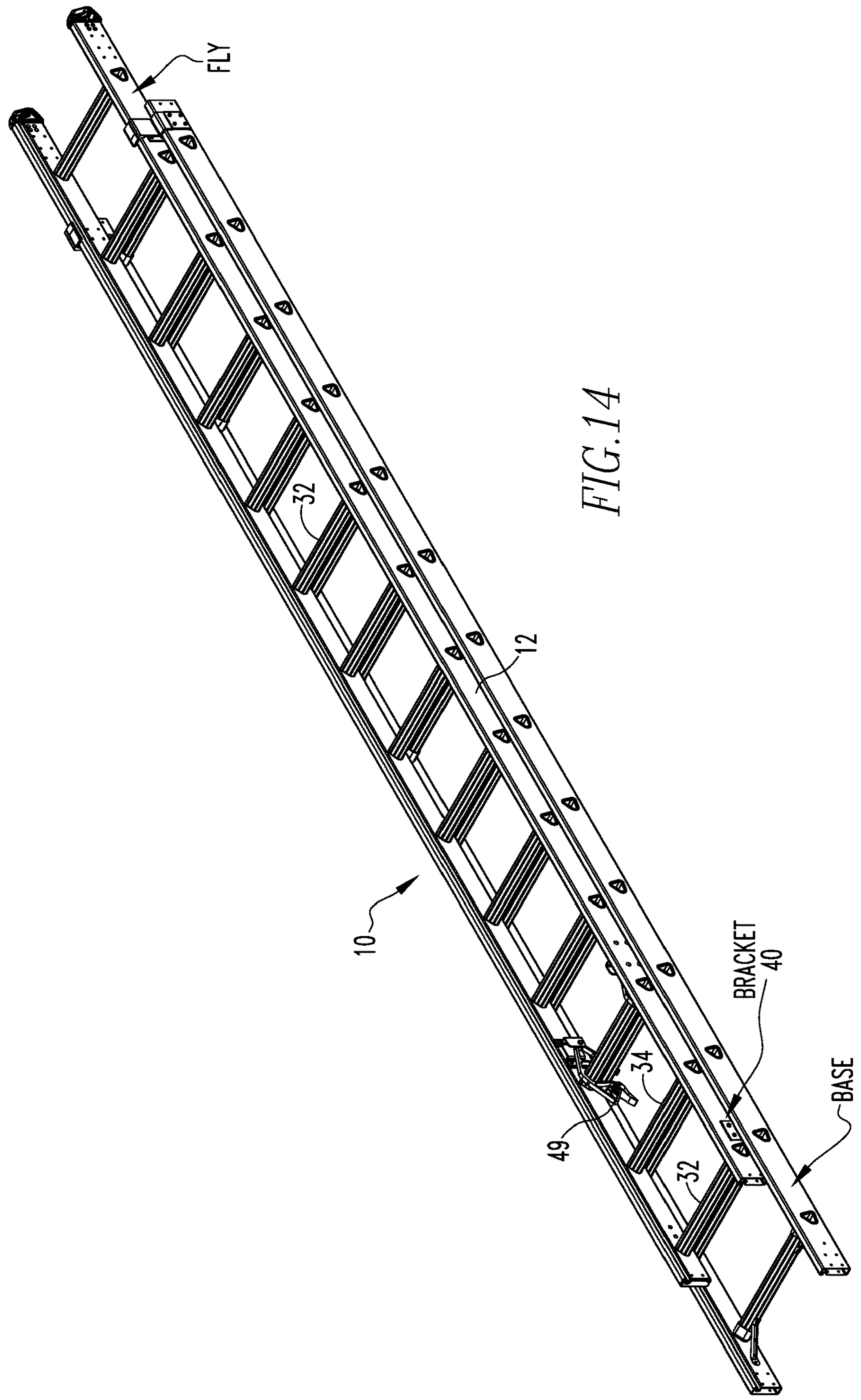
FIG. 14 shows a ladder of the claimed invention.

The first side 14 may be an external side relative to the second box rail 30 and the bracket 40 is disposed on the first side 14. The bracket 40 then may be a guide bracket, as shown in FIGS. 12A-12C. Alternatively, the first side 14 may be an external side relative to the second box rail 30 and the bracket 40 is disposed on the second side 16. The bracket 40 then may be a lock bracket, as shown in FIG. 13 to hold a lock 49.

The present invention pertains to a method for using a ladder 10. The method comprises the steps of moving the ladder 10 to a desired location. There is the step of securing the ladder at the desired location so a user may safely climb the ladder. The ladder 10 is described above.

The present invention pertains to a method for producing a ladder 10. The method comprises the steps of attaching a bracket 40 to a first box rail 12 of the ladder 10 by inserting a first fastener 46 through a first hole 26 of a third side 18 of the first box rail 12 of the ladder, a first hollow tube 36, a first hole 22 of a first side 14 of the first box rail 10 and a first hole 42 of the bracket 40. The ladder 10 having a second box rail 30, at least a portion of which is in parallel and spaced relation with the first box rail 12, a first rung 32 attached to and extending between the first and second box rails, and a second rung 34 attached to and extending between the first and second box rails. There preferably is the step of inserting a second fastener 48 extending through a second hole 28 of the third side 18, a second hollow tube 38, a second hole 24 of the first side 16 and a second bracket hole 44 of the bracket 40 so the first hollow tube 36 is disposed in the first box rail 12 in alignment with the first hole 22 of the first side 16 and the first hole 26 of the third side 18. The second hollow tube 38 is disposed in the first box rail 12 in alignment with the second hole 24 of the first side 14 and the second hole 28 of the second side 16, and the first bracket hole 42 of the bracket 40 is in alignment with the first hole 22 of the first side 14 and the second bracket hole 44 is in alignment with the second hole 24 of the first side 14.

In the operation of the invention, FIGS. 1A-1E show a short section of a hollow structural member, in this case, a pultruded FG rail having a rectangular section. This is commonly called a box rail. The longer sides of the rectangular section, the first side 14 and third side 18, are the webs. It is to the webs that components of a ladder 10 are usually attached. There are holes in both webs of the box rail to permit the insertion of fasteners.

Figure 2A:
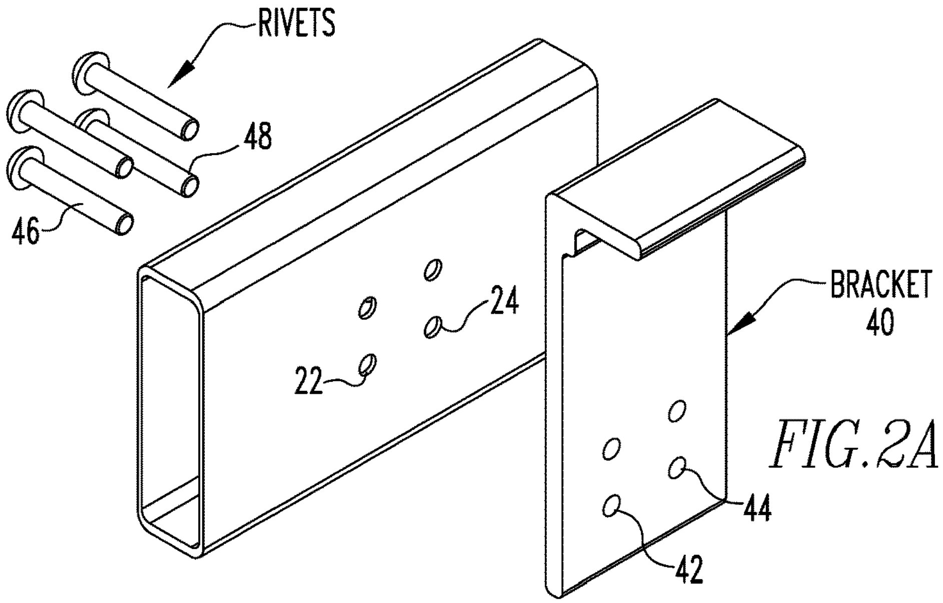
FIGS. 2A and 2B show the assembly of a guide bracket to the box rail using solid rivets but without any kind of backup.
Figure 2B:
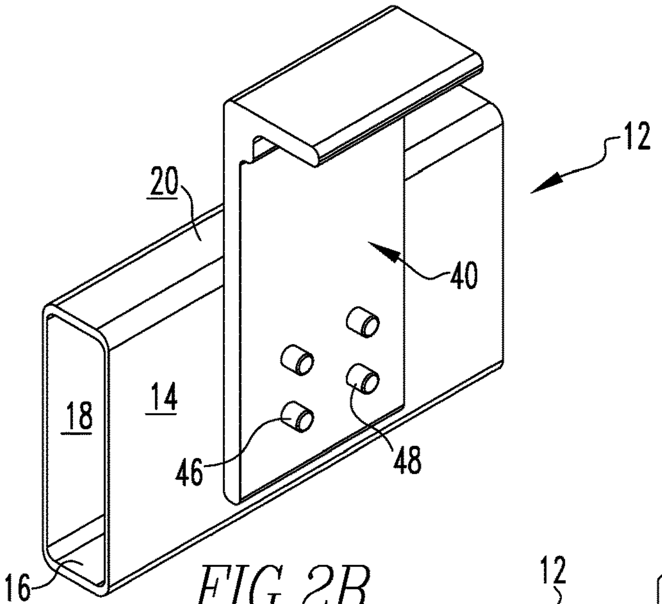

FIGS. 2A and 2B show the assembly of a guide bracket to the box rail using solid rivets but without any kind of backup.

Figure 2C:
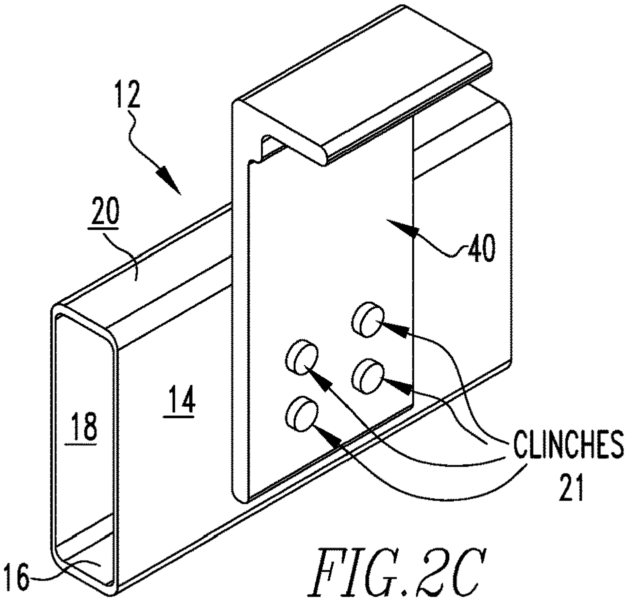
FIG. 2C shows the rivets clinched with clinches.

FIG. 2C shows the rivets clinched with clinches 21.

Figure 3B:
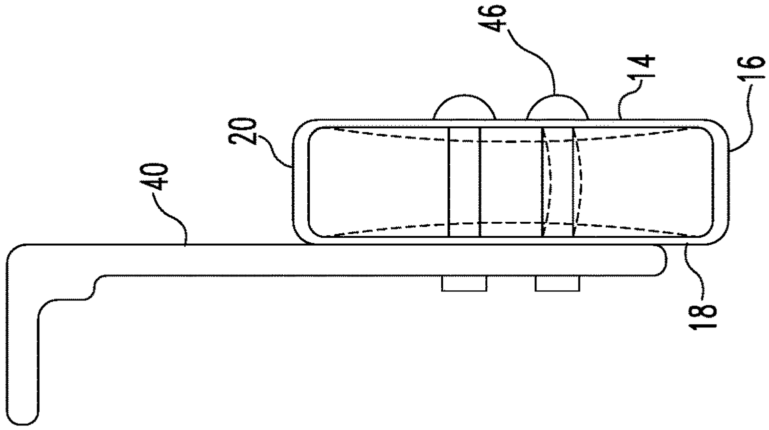
FIGS. 3A-3C provide views of the interaction of the unsupported rivets with the box rail.
Figure 3A:
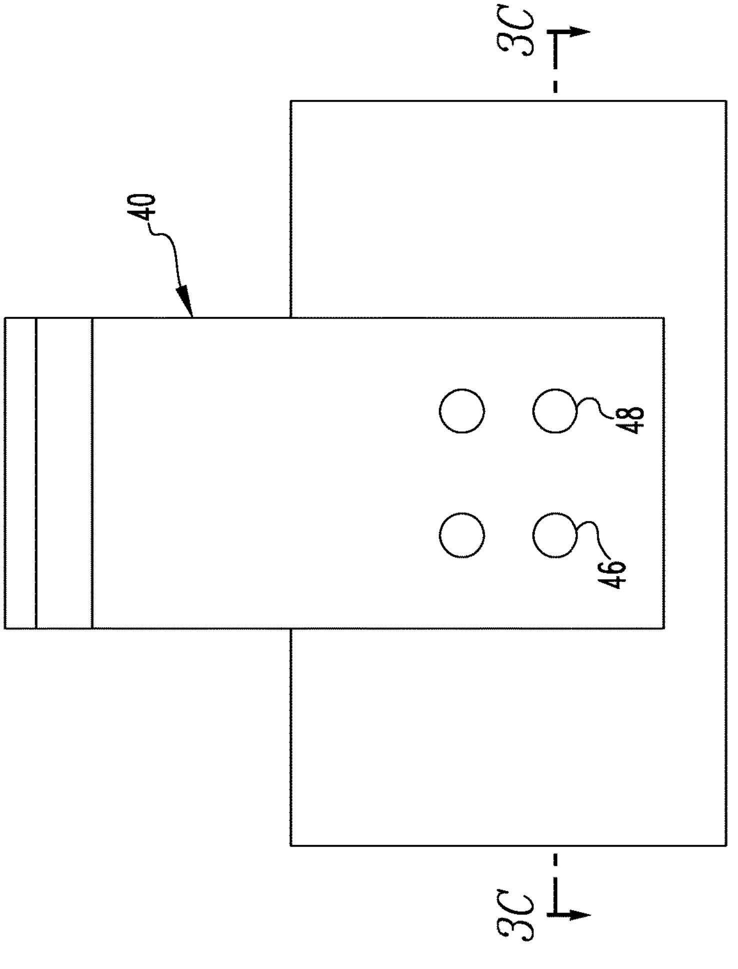
Figure 3C:
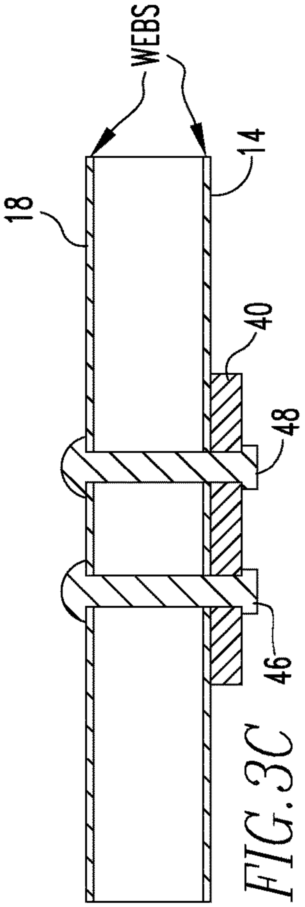
Figure 4D:
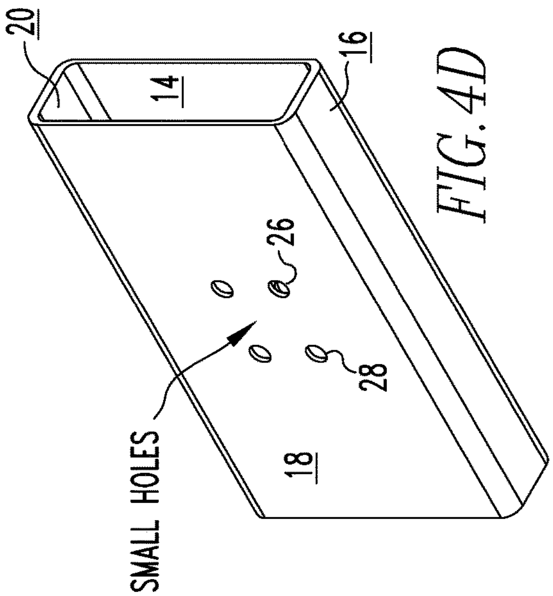
FIGS. 4A-4E show how a box rail would be pierced to receive the backup supports of this invention.
Figure 4B:
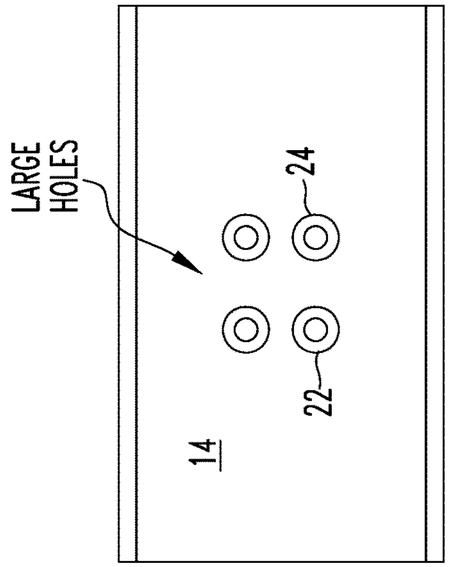
Figure 4C:
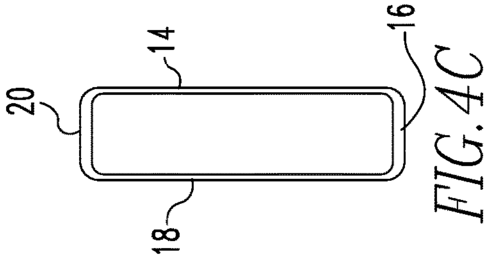
Figure 4A:
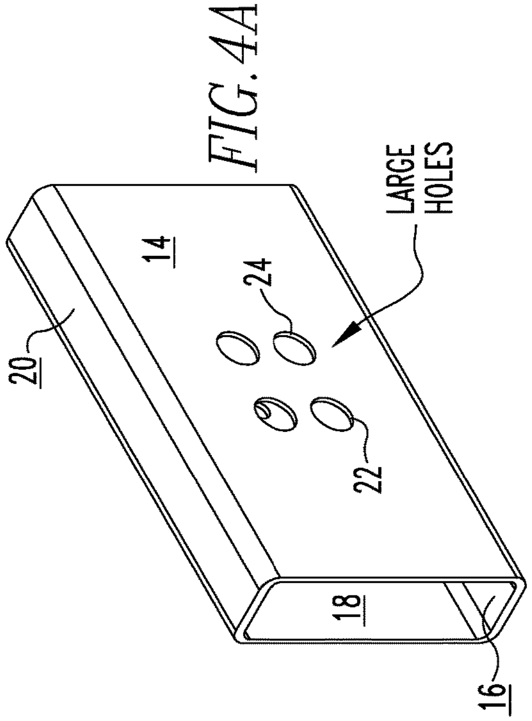
Figure 4E:
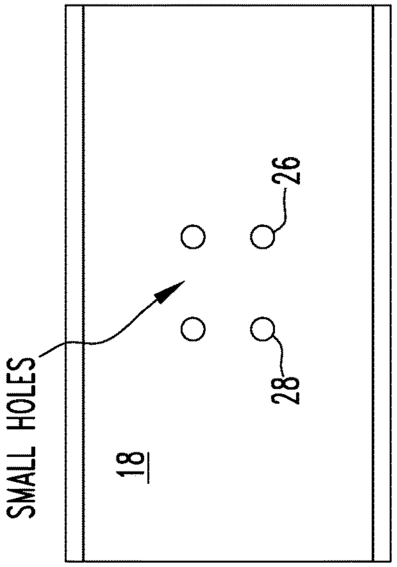

FIGS. 3A-3C provide views of the interaction of the unsupported rivets with the box rail.

The dashed lines in FIG. 3B show how the box rail webs are likely to bow inward and the shank of the rivets themselves are likely to bend under the force required to clinch the rivets.

In FIG. 3C, it can be seen that the axial tightness of the rivets can never be greater than the stiffness of the box rail webs. It is clear than some kind of backup support for the rivet shanks and the box rail webs is needed.

FIGS. 4A-4E show how a box rail would be pierced to receive the backup supports of this invention. The small holes are a close fit for the rivet shanks. The large holes permit insertion of the backup supports described below.

Figure 5A:
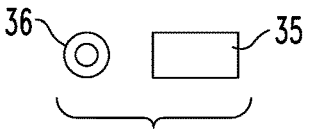
FIGS. 5A-5D show the simplest embodiment of this invention.
Figure 5B:
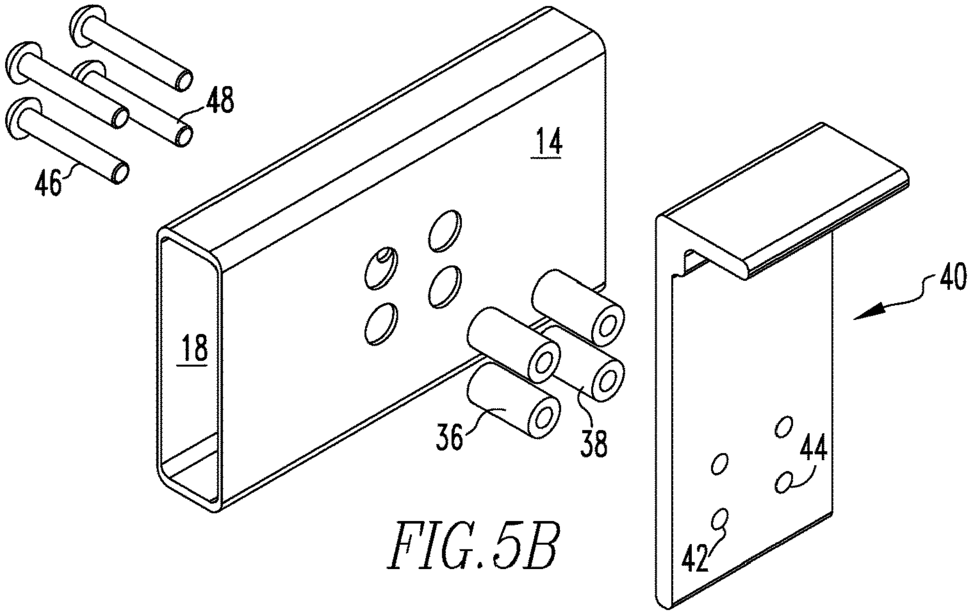
Figure 5C:
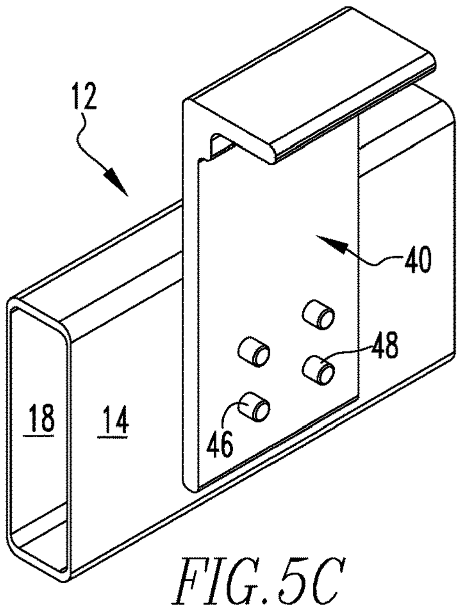

FIGS. 5A-5C show the simplest embodiment of this invention.

FIG. 5A is a plastic tube whose ID matches the rivet shank diameter and whose OD matches the large holes in the box rail. The tubes could be made of nylon, polypropylene, etc.

Figure 5D:
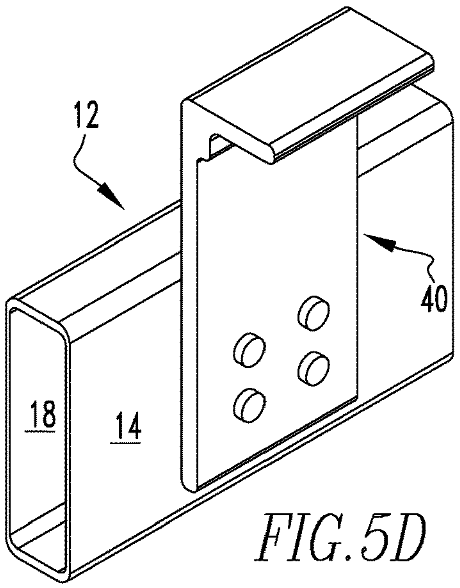

FIGS. 5B, 5C, and 5D show the tubes, rivets and bracket 40 being assembled and the rivets clinched.

Figure 6B:
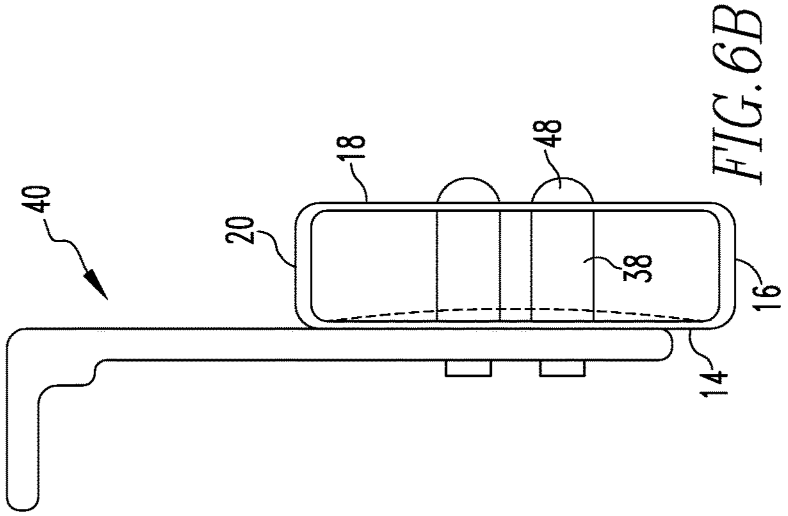
FIGS. 6A-6C show the interaction of the rivets, webs, backups and bracket.
Figure 6A:
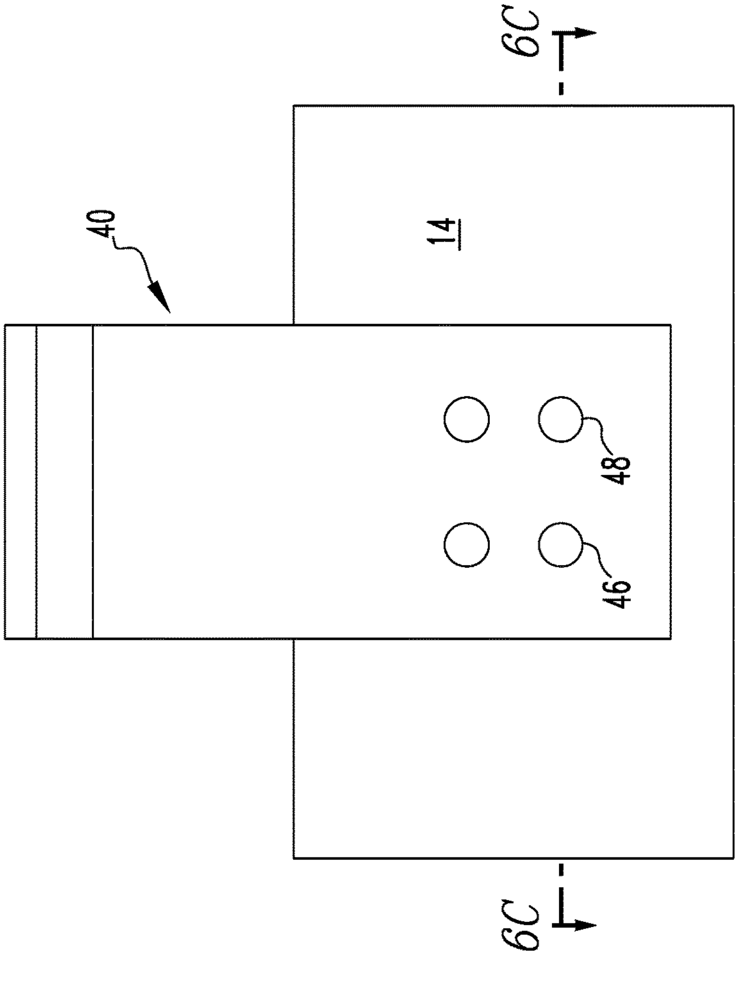
Figure 6C:
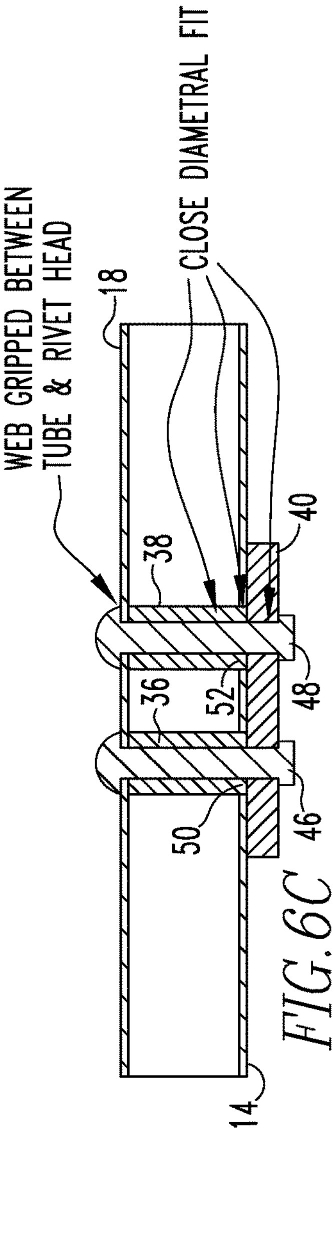

FIGS. 6A-6C show the interaction of the rivets, webs, backups and bracket 40.

The dashed line in FIG. 6B shows that the web adjacent to the bracket 40 is free to flex inward. However, it is not forced inward by the action of clinching the rivets.

The opposite web is supported by the backup tubes 36, 38.

The rivet shanks are prevented from bending due to their close fit in the plastic tubes IDs.

In FIG. 6C, it can be seen that one web of the box rail is tightly gripped between the rivet heads and one end of the backup support tubes. The clinched ends of the rivets tightly grip the bracket 40 against the opposite ends of the backup support tubes.

Thus, rigid attachment of the bracket 40 to the box rail is accomplished by the close diametral fit between the rivets, rivet holes in bracket 40, ID and OD of the backup tubes 36, 38, and large holes 22, 24 in the box rail web 14. Additionally, the bracket 40 is firmly held in the axial direction of the rivets due to the opposite box rail web 16 being gripped between the rivet heads and the backup tubes.

FIGS. 7A-7M show an improvement over FIGS. 5A-5D.

FIGS. 7A and 7E-7G shows four backup tubes molded together in a bundle with a thin plate 54 connecting them to each other.

Figure 7A:
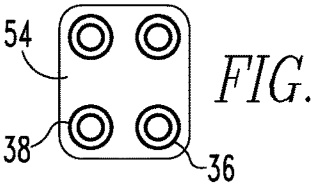
FIGS. 7A and 7E-7G show four backup tubes molded together in a bundle with a thin plate connecting them to each other.
Figure 7G:
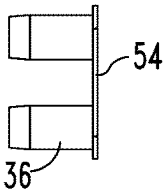
Figure 7E:
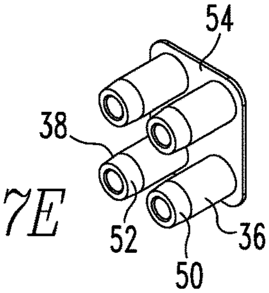
Figure 7F:
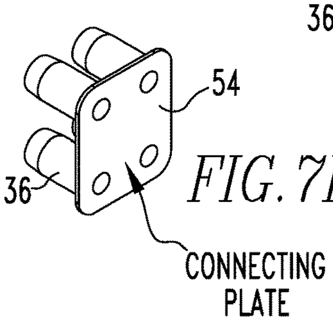
Figure 7C:
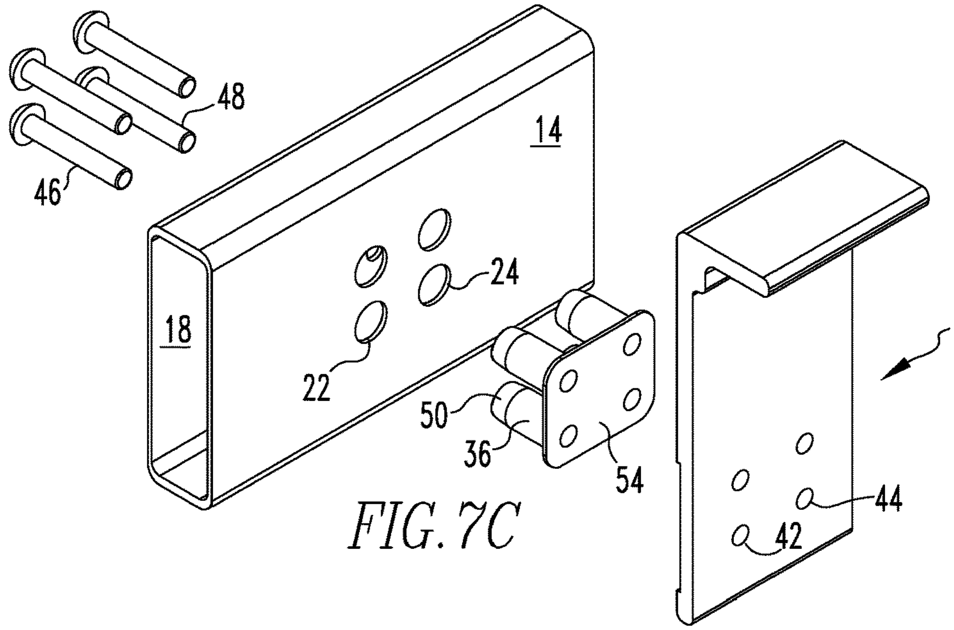
FIG. 7C shows how all four backup support tubes may be inserted into the box rail simultaneously.

FIG. 7C shows how all four backup support tubes may be inserted into the box rail simultaneously.

Figure 7B:
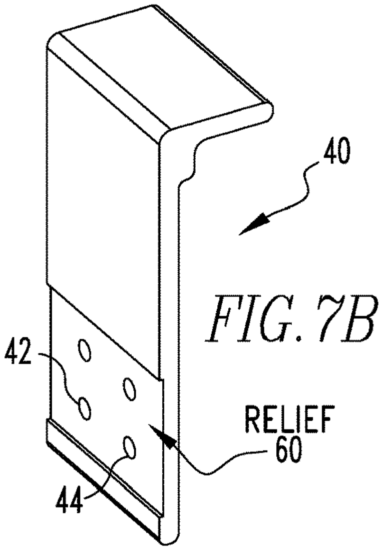
FIG. 7B shows a bracket with a relief.
Figure 7D:
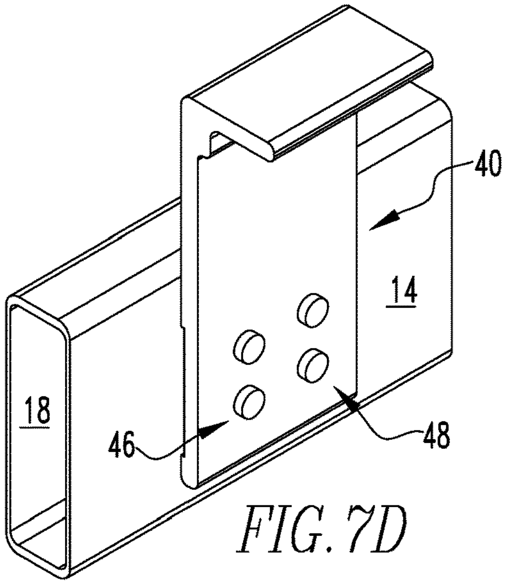
FIG. 7D shows the assembly with rivets clinched.
Figure 7H:
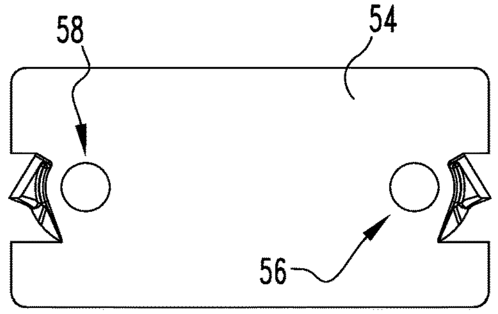
FIGS. 7H-7M shows two backup tubes having catches molded together in a bundle with a thin plate connecting them to each other.
Figure 7M:
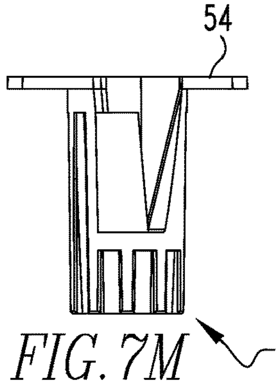
Figure 7L:
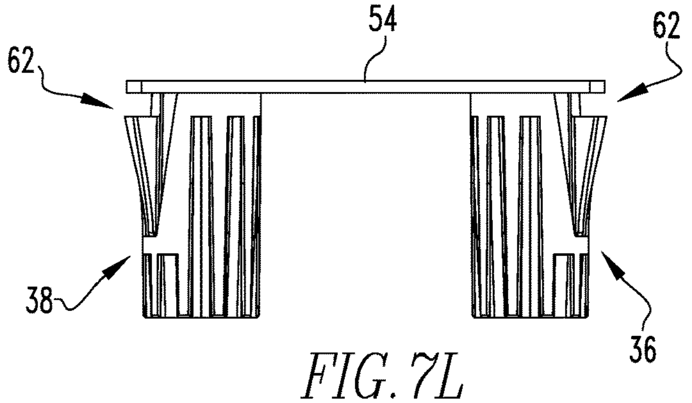
Figure 7K:
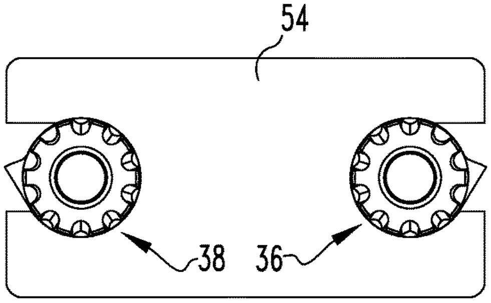
Figure 7I:
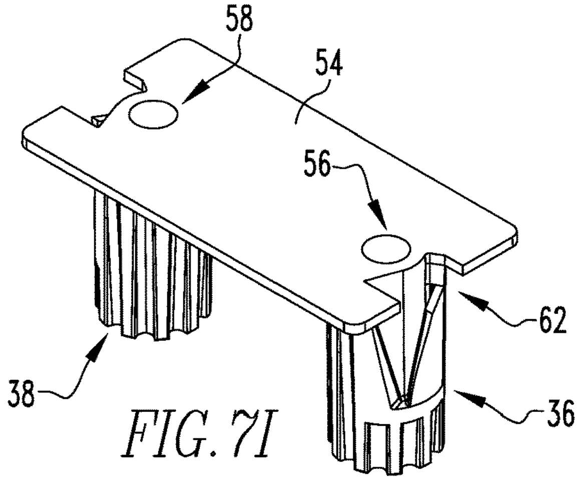
Figure 7J:
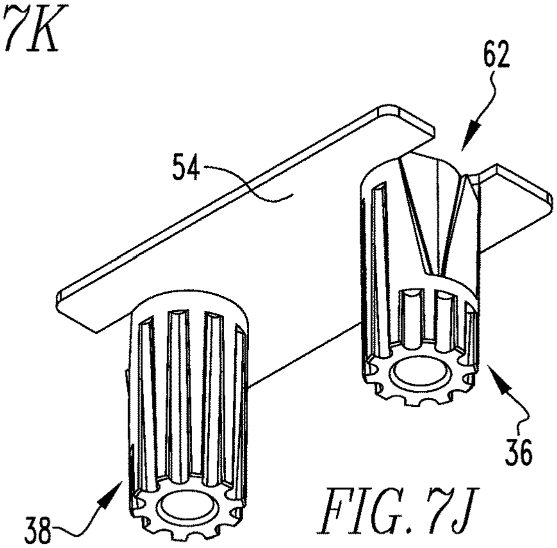

FIG. 7D shows the assembly with rivets clinched.

FIGS. 7H-7M shows two backup tubes having catches 62 molded together in a bundle with a thin plate 54 connecting them to each other.

Note, in FIG. 7B that the bracket 40 may be formed with a relief 60 corresponding to the size of the thin connecting plate. This relief 60 enables the bracket 40 to make contact with the web of the box rail as FIGS. 8B and 8C show.

FIGS. 8A-8C show that the bracket 40 is firmly clinched against the thin plate of the backup support tubes. The relief 60 in the bracket 40 permits the bracket 40 to also contact the adjacent web.

The web opposite the bracket 40 is firmly gripped between the rivet heads and the backup support tubes.

As in FIG. 6B, the web adjacent to the bracket 40 is free to flex inward but it is not forced inward by the action of clinching the rivets.

FIGS. 9A-9E show a further development of the embodiment of FIGS. 7A-7G. Catches 62 are formed on one side of each of the four backup support tubes within the bundle.

Figure 10A:
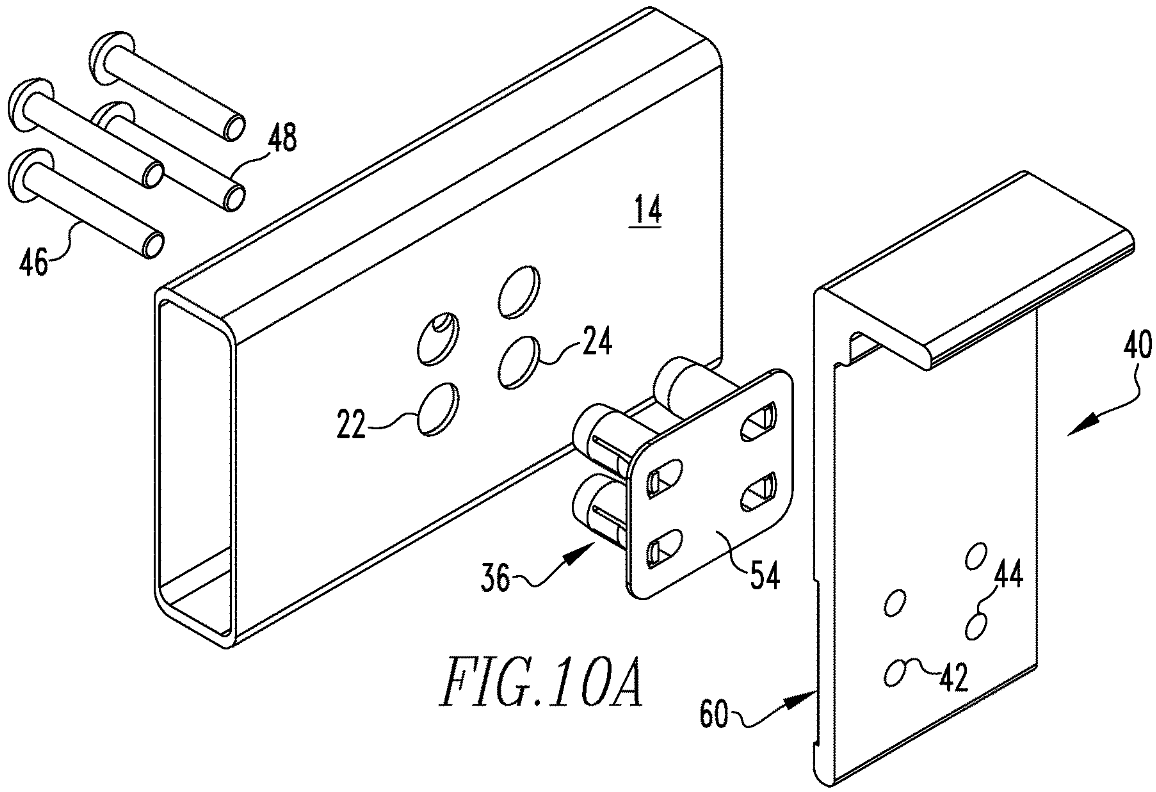
FIGS. 10A and 10B show the assembling and final clinched condition of the bracket and box rail assembly.
Figure 10B:
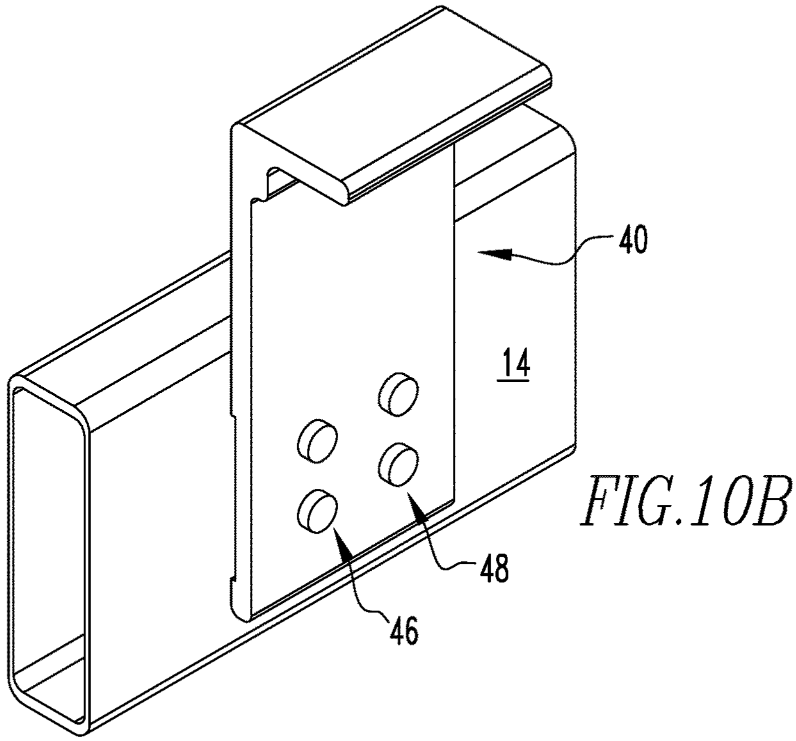

FIGS. 10A and 10B show the assembling and final clinched condition of the bracket 40 and box rail assembly. The catches 62 deflect inward as the backup tube bundle is inserted into the box rail. At full insertion, the catches 62 move outward again. This snap action of the catches 62 retain the backup tube bundle because the catches 62 grip the inside of the box rail web.

Figure 11B:
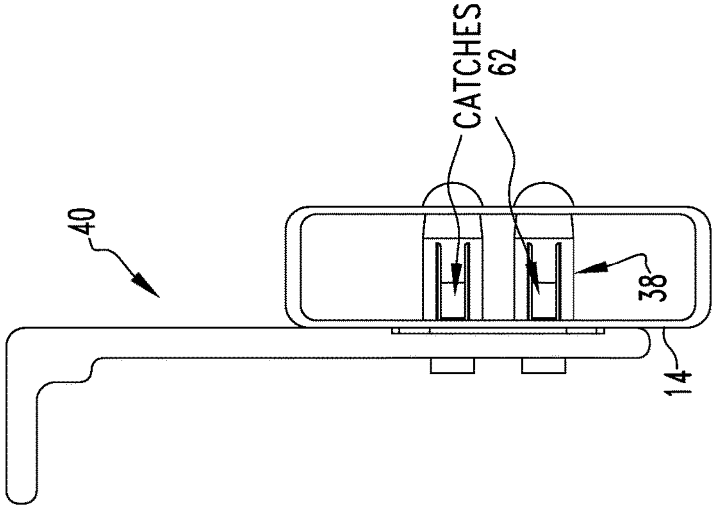
FIGS. 11A-11C show how the catches on the backup tube bundle support the web adjacent to the bracket so that it will not flex inward.
Figure 11A:
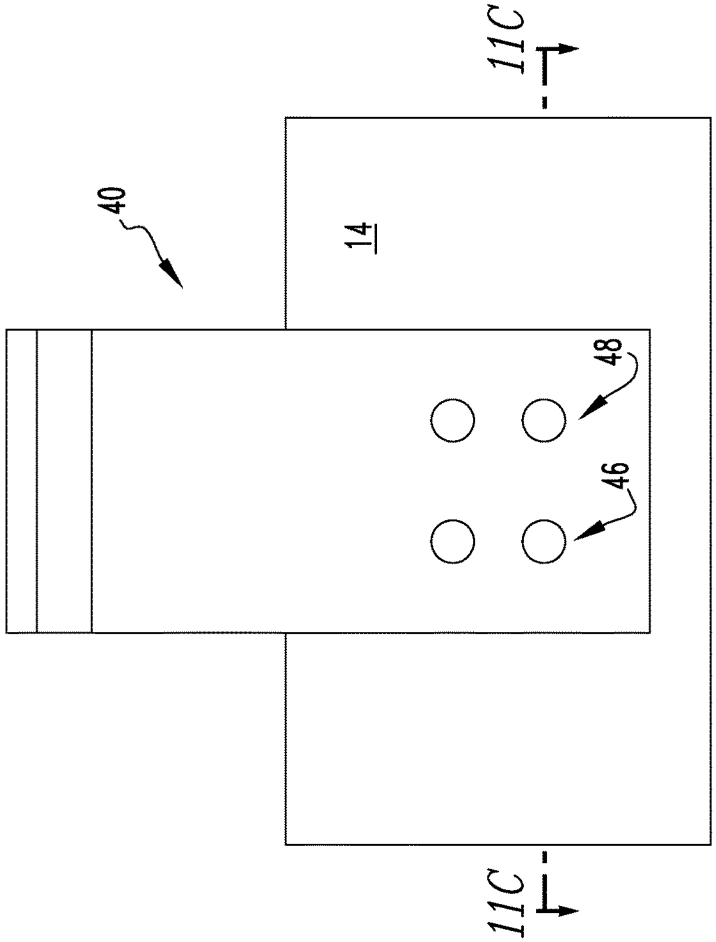
Figure 11C:
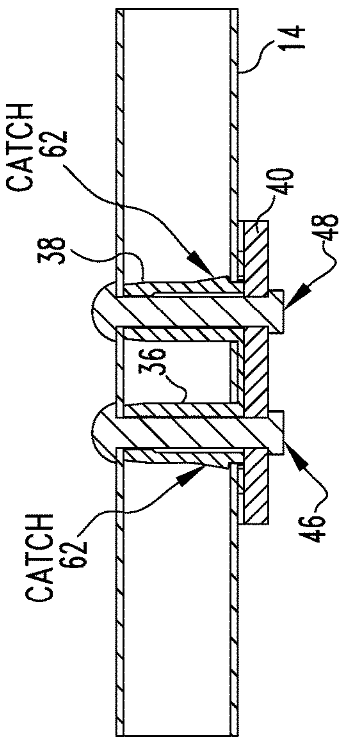

FIGS. 11A-11C show how the catches 62 on the backup tube bundle support the web adjacent to the bracket 40 so that it will not flex inward.

Bundles with two or four backup support tubes are shown but bundles with only one or any number of tubes could also be made depending on the hole patterns of the components being attached to the box rail. Solid rivets are shown, but semi-tubular rivets or threaded bolts and nuts could also be used as fasteners with this invention. The ladder 10 can support 250 lbs., 350 lbs. and even 500 lbs. pounds of compressive load without failing or cracking or bending, depending on the thickness of the materials used, such as metal-aluminum or steel- or fiberglass or other composites.

One way to join a hollow rung to a ladder box rail, the rung is inserted through close-fitting holes in the inner and outer webs of the box rail. The outboard end of the rung protrudes a short distance, about 0.200 inches, past the outer web of the box rail. Tooling is used to cause the outboard end of the hollow rung to be flared and rolled over. Additional tooling is used to internally expand or bulge the hollow rung within the region between the box rail webs until the rung fits tightly in the holes in the webs. Another way is described in concurrently filed U.S. patent application Ser. No. 16/795,171, filed with the U.S. Patent and Trademark Office on Feb. 19, 2020, incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:

a first box rail having a first side, a second side extending perpendicularly from the first side, a third side extending perpendicularly from the second side and in parallel and spaced relation with the first side, and a fourth side extending perpendicularly from the third side and in parallel and spaced relation with the second side, the first side having a first hole, the third side having a first hole in alignment with the first hole of the first side;

a plate having a first tube coupled thereto and a peripheral edge with a cut-out, the first tube including a catch that is aligned with the cut-out; the catch being generally rectangular in shape with one corner bent away from the first tube, and three corners of the rectangular shape of the catch attached to the first tube, the first tube disposed in the first box rail in alignment with the first hole of the first side and the first hole of the third side;

a bracket having a first bracket hole in alignment with the first hole of the first side; and a first fastener extending through the first hole of the third side, the first tube, the first hole of the first side and the first bracket hole which attaches the bracket to the first box rail.

2. The ladder of claim 1 wherein a diameter of the first tube is larger than a diameter of the first hole of the third side.

3. The ladder of claim 1 wherein the first tube includes a first end disposed in the first hole of the first side and a second end adjacent the first hole of the third side.

4. The ladder of claim 1, wherein the plate includes a first plate hole, the first tube aligned with the first plate hole.

5. The ladder of claim 4 wherein the plate is disposed between the first side and the bracket, the first fastener extending through the first hole of the third side, the first tube, the first hole of the first side, the first plate hole and the first bracket hole to fasten the bracket to the first box rail.

6. The ladder of claim 1 wherein the three corners of the catch are flush with an external surface of the first tube.

7. The ladder of claim 1 wherein the first tube further includes a plurality of ridges, at least one edge of the catch being aligned with one of the plurality of ridges.

8. The ladder of claim 1 wherein the ladder further includes a second box rail spaced from the third side of the first box rail, and the bracket is disposed on the first side of the first box rail.

9. The ladder of claim 1 wherein the bracket is a guide bracket.

10. The ladder of claim 1 wherein the bracket is disposed on the third side or the first side.

* * * * *